United States Patent [19]

Bahroos et al.

[11] Patent Number: 4,927,115
[45] Date of Patent: May 22, 1990

[54] VALVE FOR A HAND HELD SPRAY NOZZLE

[75] Inventors: Gobind Bahroos, Riverview, Mich.; Patrick B. Jonte, Indianapolis, Id.

[73] Assignee: Masco Corporation of Indiana, Taylor, Mich.

[21] Appl. No.: 358,309

[22] Filed: May 26, 1989

[51] Int. Cl.⁵ .............................................. F16K 31/44
[52] U.S. Cl. .................... 251/241; 251/357; 251/900; 239/589
[58] Field of Search ............... 251/240, 241, 245, 246, 251/323, 333, 900, 357, 360; 239/589, 523

[56] References Cited

U.S. PATENT DOCUMENTS

| D. 233,606 | 11/1974 | Rauh et al. | D23D/37 |
|---|---|---|---|
| 2,110,326 | 3/1938 | DeLuncey | 251/241 |
| 2,129,511 | 9/1938 | Tompkins et al. | 251/241 |
| 2,417,546 | 3/1947 | DeGiers | 239/583 |
| 2,482,223 | 9/1949 | Strid et al. | 251/241 |
| 2,577,255 | 12/1951 | Logan et al. | 251/240 |
| 2,633,150 | 3/1953 | Lewis | 137/604 |
| 2,792,260 | 5/1957 | Wood | 239/526 |
| 2,989,283 | 6/1961 | Klingler | 251/86 |
| 3,539,151 | 11/1970 | Reid | 251/321 |
| 3,588,040 | 6/1971 | Ward | 251/241 |
| 3,884,419 | 5/1975 | Geoffray | 239/526 |
| 3,891,180 | 6/1975 | Bebinger | 251/120 |
| 4,015,632 | 4/1977 | Frahm | 251/321 |
| 4,193,553 | 3/1980 | Kelly et al. | 239/586 |
| 4,316,600 | 2/1982 | Parise et al. | 251/245 |
| 4,822,003 | 4/1989 | Self | 251/333 |

OTHER PUBLICATIONS

Whitey Co. Integral Bonnet Needle Valves.
Nupro Co. "J" Series, Swajelok Co., 1987.
Manatrol-Parker Fluidpower Check Valves, Pressure Control Valves and Two-Way Valves, 1987.
Lesslie-Lifetime Cage Trim Control Valves, E. I. Dupont de Nemours Co., Inc., 1987.

*Primary Examiner*—A. Michael Chambers
*Attorney, Agent, or Firm*—Steven L. Permut; Malcolm L. Sutherland

[57] ABSTRACT

A hand held spray nozzle (10) for a kitchen faucet has a valve housing (12) with an elongated passage (20) and a valve seat (28). A valve element (36) has a frusto-conical elastomeric sleeve (40) engageable to the valve seat (36) and has a camming surface (44) mounted upstream from the elastomeric sleeve (40) and a stabilizer flange (48) mounted further upstream from the camming surface (40) and a spring seating end (50) which seats a biasing spring (58) which biases the valve element to the closed position. A push rod (62) engages the camming surface (44). The push rod (62) is canted from the vertical position at approximately (60) degrees and has an outer end (75) engaging a pivoting handle (78) where the thumb engaging section (82) is at a wall opposite abutment section (76) which engages the outer end (75) of the push rod (62).

13 Claims, 1 Drawing Sheet

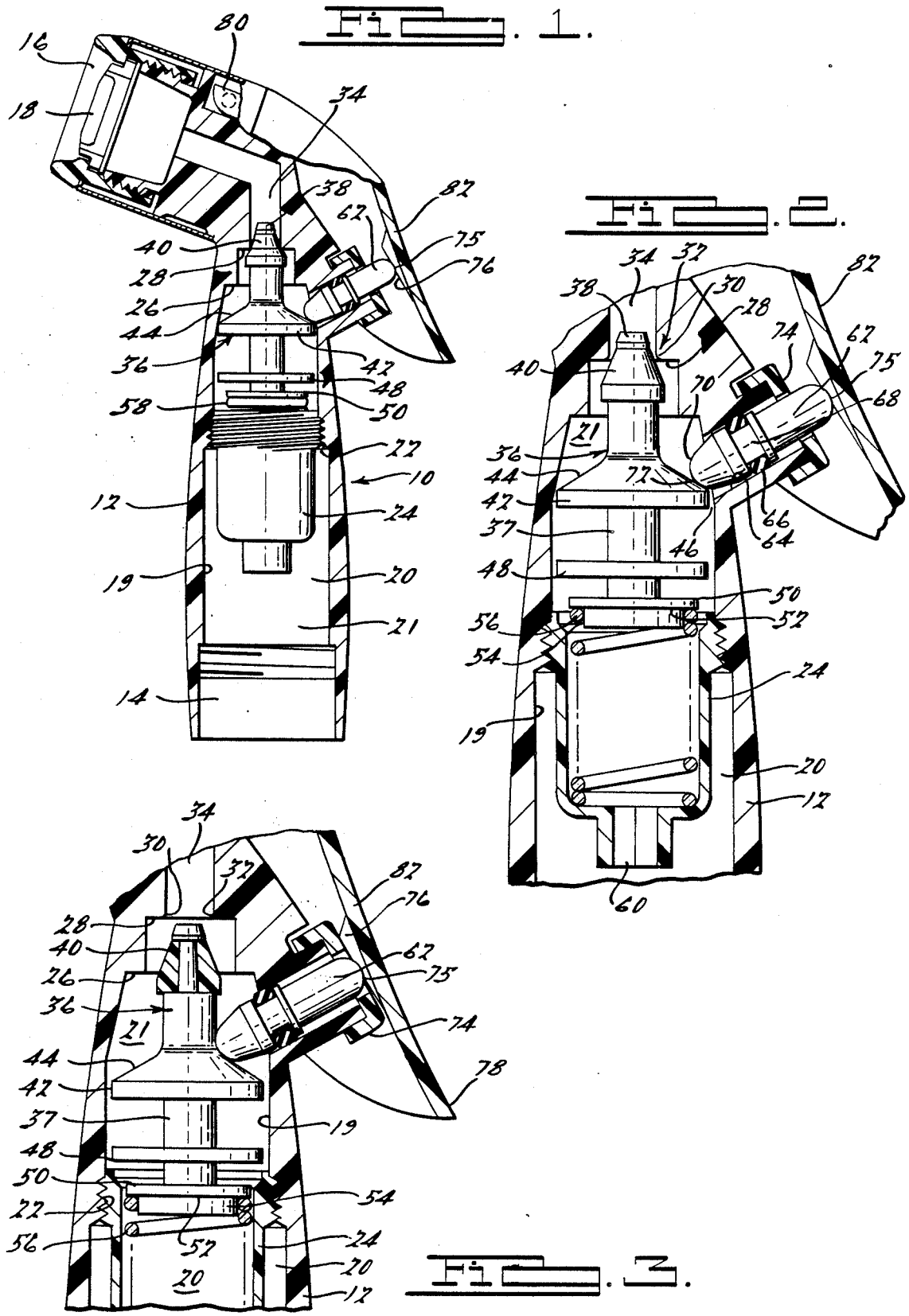

VALVE FOR A HAND HELD SPRAY NOZZLE

TECHNICAL FIELD

This invention relates to valves and more particularly to a valve for a hand held spray nozzle for a kitchen sink and the like.

BACKGROUND OF THE INVENTION

Hand held spray nozzles for kitchen sinks and the like have long been commonplace. Normally, water flows through a faucet valve and a diverter valve is usually mounted within the faucet body that allows water to go to the faucet spout or to a flexible hose that leads to a hand held spray nozzle that can pull out from the rim of a kitchen sink. The spray nozzle is normally in the off position and an operator, when wanting the spray, can press the handle and turn on the spray.

However spray nozzles have been limited to either being on or off without any means for effectively modulating the volume of the spray. Construction of the valve within the spray was such that if modulation was attempted, an undesirable chattering of the valve element in the spray nozzle would occur. Hence, most people did not attempt to modulate the volume but were merely satisfied to have the spray on or off.

What is needed is an easily constructed, hand held spray nozzle which is constructed for ease of operation, to provide for modulation of the spray and at the same time assure a leak resistant valve when the valve is in the off position. Furthermore, it is desirable to provide for a vegetable spray valve that is downsized but still maintains the capacity for water flow found in the prior art.

SUMMARY OF THE INVENTION

In accordance with one aspect of the invention, a hand held spray nozzle is characterized by a housing having an upstream end and downstream end. The upstream end has an inlet constructed to be connected to a flexible hose fitting. The downstream end has the spray outlet. An elongated passage passes through the housing from the inlet to the outlet. The housing has an interior wall circumscribing the passage and the valve seat is formed by a step of the interior wall. A valve element is axially mounted within the housing for axial movement along the axis of the passageway between an open position and a closed position with respect to the valve seat. The movable valve element has a frusto-conical elastomeric section abutable against the valve seat and a camming section mounted upstream of the frusto-conical elastomeric section. A stabilizing element is axially spaced upstream from the camming section and is radially sized approximately the same as the camming section to be slightly spaced from the interior housing wall to prevent the movable valve element from being overly canted from the axis of the elongated passage so that it maintains its axially aligned position.

A push rod is preferably slidably mounted with respect to the housing and is canted with respect to the longitudinal axis of the passage and valve element. The push rod has an inner end abutting the camming section of the valve element and an outer end extending outside of the housing. An operating means, preferably a pivotably mounted handle, abuts the outer end of the push rod to move the push rod inward such that its inner end abuts the camming section to force the valve element to the open position. A biasing means such as a coil spring is mounted within the housing to bias the valve element to the closed position.

Preferably the camming section is frusto-conical in shape to allow the valve to rotate about its longitudinal axis and still maintain operable positioning with respect to the push rod.

The push rod is canted with respect to the axis of the valve element at an upward angle of approximately 60 degrees. However, this canted angle can vary from as little as 20 degrees from the longitudinal axis to as large as approximately 80 degrees and still maintain commercial viability. The camming section is canted from the longitudinal axis at a downward angle of approximately 60 degrees whereby axial travel of the push rod provides for approximately equal amount of axial travel of the valve element. As the push rod varies from the 60 degree cant the acute angle of the frusto-conical camming surface of the valve element also would vary to maintain the one-to-one travel ratio.

In accordance with another embodiment of the invention, a valve is characterized by the housing having the passage between the upstream end with a fluid inlet and a downstream end with a fluid outlet with the interior wall of the housing having a shoulder with a small radius section forming a valve seat. A plunger type axially movable valve element is mounted within the housing and has a frusto-conical elastomeric section mounted at its downstream end forming a downward angle of approximately 20 degrees from the longitudinal axis of the valve element to abut the small radius section forming the valve seat when in the closed position. The elastomeric section can form other angles being substantially less than 45° and still provide the advantages of the invention. A drive means is positioned upstream of the valve seat for driving the valve element to the open position and a biasing means biases the valve element to the closed position. The biasing means is also mounted upstream of the valve element. In this fashion, the narrower part of the elongated passage downstream of the valve seat remains open and free from any drive mechanisms or stems. A smaller valve seat can be provided without compromising flow rate. By decreasing the size of the valve seat more design flexibility is allowed for smaller and narrower spray nozzles. The push rod, by being upstream of the valve, is hydraulically pushed outward such that the handle is biased by both the spring and hydraulic pressure. The valve, by being severely tapered, provides a modulating effect. All of these advantages are found in a spray valve assembly that is easily assembled and has good durability.

BRIEF DESCRIPTION OF THE DRAWINGS

Reference now is made to the accompanying drawings in which:

FIG. 1 is a partially segmented view of a hand operated spray nozzle shown in the closed position in accordance with the invention;

FIG. 2 is a fragmentary enlarged view of the spray nozzle shown in FIG. 1 in the modulated or partially open position; and FIG. 3 is an enlarged fragmentary view of the spray nozzle in the full open position.

DETAILED DESCRIPTION OF THE PREFERRED EMBODIMENT

Referring to FIG. 1 a spray nozzle 10 includes a housing 12 that has an inlet end 14 that is threadably engageable to a flexible hose fitting and an outlet end 16 that mounts an orifice plate 18 that forms a spray pattern for the exiting water. An elongated passage 20 extends between the inlet 14 and outlet 16. The passage 20 is defined by an inner wall 19 of housing 12 that has a threaded section 22, a second step 26 and a third step 28. Step 28 has a radius section 30 that forms a valve seat 32. Threaded section 22 engages a spring retainer 24. The elongated section has a downstream end 34 in direct communication with the outlet 16.

A valve element 36 has a first end 38 with a frusto-conical elastomeric sleeve 40 fitted in a groove 41 of the valve element 36. The frusto-conical elastomeric sleeve 40 is sized such that it can abut the radius valve seat 32 when the valve element is in a closed position as shown in FIG. 1. The valve element 36 has a frusto-conical camming flange 42 mounted upstream of the elastomeric sleeve 40. The flange 42 has its camming surface 44 approximately 30 degrees from the horizontal plane as shown in the drawing or approximately forming a downward angle of 60 degrees from the longitudinal central axis of the valve element. The camming flange 42 has a diameter which is less than the diameter of the passage 20 to form clearance 46 for water flow thereby.

Further upstream from the central stem 37 of valve element 36 is a stabilizing flange 48 which has the same diameter as the camming flange 42. Further upstream from the stabilizing flange 48 is the second end 50 which has a shoulder 52 and a cylindrical wall 54 upstream therefrom which is sized to receive an end 56 of a coil spring 58. The coil spring 58 is housed in the spring retainer 24. Spring retainer 24 has an opening 60 therethrough which allows for water flow therethrough. The opening 60 is shaped to receive an allen wrench for allowing the retainer to be threaded into section 22. The second end 50 is radially sized to fit within retainer 24 and leave a passage clearance therebetween as shown in FIG. 3.

A push rod 62 is mounted in opening 64 in housing 12. An O-ring seal 66 is mounted in the groove 68 in the push rod 62. The push rod 62 has an inner tapered end 70 with a radial tip 72. The push rod 62 is retained by a cap 74 which is affixed to the housing 12. The push rod 62 and opening 64 are canted at an upward angle from the vertical as shown in the drawings at approximately 60 degrees, i.e. approximately 30 degrees canted from the horizontal. The tapered end 70 with the radial tip 72 abuts the camming surface 44. The outer end 75 abuts an abutment 76 of a pivoting handle 78 that has a pivot mount 80 at one end thereof. The abutment 76 is substantially spaced from the pivot end 80 with a thumb engageable surface 82 on a wall opposite the abutment 76.

The operation of the spray nozzle is provided by the handle 78. Normally, the spring 58 biases the valve element 36 to the closed position such that the frusto-conical elastomeric section 40 abuts the valve seat 32. The spring 38 via valve element 36 and hydraulic pressure exerted directly on push rod 62 also biases handle 78 upward. The valve element 36 is pressure responsive such that higher pressures in the upstream section 21 of passage 20 cause the valve element elastomeric section 40 to more tightly seal against the valve seat 32.

As shown in FIG. 3 the handle can be pressed to axially move the push rod 62 such that the radial tip 72 moves downward and axially inward toward the central axis of the valve element 36. The cant of camming surface 44 then provides that the downward motion of the valve element equals the axial motion of the push rod. The frusto-conical elastomeric section 40 is thus moved to the open position. In this position water flows through passage 20, downstream section 34, plate 18, and outlet 16.

The spray valve is also provided with a throttling adjustment by partial motion of the valve handle 78 so that push rod 62 is only partially moved downward and inward and the frusto-conical elastomeric sleeve 40 provides a throttling effect with respect to valve seat 32 and therefore modulation of the spray can occur.

The frusto-conical seal 40 by having a greatly tapered surface that forms approximately a 20 degree angle from the longitudinal axis of the valve element provides an effective seal against the sharp radius of valve seat 32 from a fairly effective low spring force. Therefore, a spring with a low stiffness can be used to bias the valve element 36 to the closed position and still maintain a valve element resistant against leaks. Because of the low spring force, the push rod 62 can be effectively operated with little or no leveraging so that the thumb position on handle 78 can be directly over the outer end 75 of the push rod 62. In this way, a pivoting lever handle 78 is optional and can be replaced by a push button directly connected to the outer end 75 of push rod 62.

Further design freedom is obtained by eliminating a stem protruding through the downstream end 34 of the passageway which would therefore necessitate a larger valve seat 32. By downsizing the valve seat 32, a smaller passageway 34 is provided without comprising flow rates. Therefore a housing with a small outer diameter can be constructed if the design so dictates.

Again, downsizing is achieved by matching the radius of tip 72 with the radius curve between stem 37 and camming surface 44 so that the maximum effective geometry between flange 42 and push rod 62 is achieved with the minimum amount of interference.

The taper of the frusto-conical section 40 by being approximately 20 degrees allows for metering of the flow without hammering or chattering of the valve element which is so common in prior spray nozzles.

The frusto-conical section 40 allows the valve element 36 to rotate about its axis without affecting the function of the valve element and thereby to provide for even wear and thus increased durability.

The small valve seat 32, low spring rate 58, valve element by being positioned at the upstream side of the valve seat, and the drive mechanism by being angled with respect to the valve element axis provides for the above noted advantages while allowing an easily constructed and durable spray nozzle with a metering valve mounted therein.

Variations and modifications of the invention are contemplated without departing from its spirit as defined in the appended claims.

The embodiments in which an exclusive property or privilege is claimed are defined as follows:

1. A valve characterized by:
    a housing having an upstream end constructed to be secured to a flexible hose and a downstream end having a fluid outlet and a valve seat;
    a movable valve element axially movable along an axis between an open and closed position;
    a push rod canted with respect to said axis;
    an annular frusto-conical camming member affixed upstream of and to said valve element for abutting said push rod;

a handle means for axially moving said push rod against said camming means for axially moving said valve element upstream to said open position; and biasing means for biasing said valve element to said closed position.

2. A valve as defined in claim 1 further characterized by:

said handle means includes a handle lever having one end pivotably mounted to said body and an abutment substantially spaced away from said one end to abut said push rod and an engagement section on an opposite wall from said abutment for engaging an operator's thumb.

3. A hand held nozzle characterized by:

a housing having an upstream end constructed to be secured to a flexible hose and a downstream end having a fluid outlet and an elongated passage therebetween with an interior housing wall circumscribing said passage;

a valve seat mounted about said passageway in said housing;

a valve element axially movable along an axis of said elongated passage between an open position and closed position with respect to said valve seat;

said movable valve element having a frusto-conical elastomeric section sized to abut against said valve seat;

a camming section mounted upstream of said frusto-conical elastomeric section;

a stabilizing element axially spaced upstream from said camming section and radially sized approximately the same as said camming section to be slightly spaced from said interior housing wall to prevent said movable valve element from being overly canted from the axis of the elongated passage;

a push rod slidably mounted with respect to said housing and canted with respect to said passage axis;

said push rod having an inner end abutting said camming section and an outer end extending outside of said housing;

operating means for pushing said push rod against said camming section to move said valve element to said open position; and biasing means for biasing said valve element to said closed position.

4. A hand held nozzle as defined in claim 3 further characterized by:

said camming section being frusto-conical in shape to allow said valve to rotate about its longitudinal axis and maintain operable position with respect to said push rod.

5. A hand held nozzle as defined in claim 3 further characterized by:

said push rod being canted with respect to said axis of said valve element a first acute angle of approximately 60° and said push rod being canted from said axis substantially approximately a second acute angle of approximately 60° whereby axial travel of said push rod provides for an approximately equal amount of axial travel of said valve element.

6. A valve characterized by:

a housing having an upstream end with a fluid inlet, a downstream end having a fluid outlet and an elongated passage therebetween with an interior housing wall circumscribing said passage;

said interior wall having an annular shoulder with a small radius section forming a valve seat between a narrow section and wider section of said elongated passage;

a plunger type valve element mounted for axial movement in said elongated passage between an open position and closed position with respect to said valve seat;

said valve element having an elastomeric section having a frusto-conical shape sized to abut against said small radius section of said shoulder in said elongated passage; said frusto-conical elastomeric section forming an angle of substantially less than 45° with respect to the longitudinal axis of the valve element;

a drive means positioned upstream of said valve seat for driving said valve element to said open position;

a biasing means for biasing said valve element to said closed position;

said drive means including:

push rod canted with respect to said valve element;

a camming surface fixedly positioned on said valve element for abutting said push rod, said camming surface positioned upstream of said elastomeric section; and a handle means abutable against an outer section of said push rod and operable for moving said push rod to push against said camming member and move said valve element upstream to an open position.

7. A valve as defined in claim 6 and further characterized by:

said elastomeric section includes an annular elastomeric sleeve with a frusto-conical outer surface section;

said elastomeric sleeve fitted in an annular groove in a said plunger type valve element near a first end thereof.

8. A valve as defined in claim 6 further characterized by:

said push rod canted from the longitudinal axis of the valve element between 20° and 80°.

9. A valve as defined in claim 8 further characterized by:

said camming surface being complementarily canted such that axial movement of the push rod provides for approximately equal movement of said valve element along its respective longitudinal axis.

10. A valve as defined in claim 6 further characterized by:

said push rod being canted from the longitudinal axis of said valve element approximately 60° and said camming surface being canted at an angle of approximately 30° from the horizontal.

11. A valve as defined in claim 6 further characterized by:

said camming surface being frusto-conical in shape.

12. A poppet valve element for a hand held spray nozzle, said valve element characterized by:

a frusto-conical elastomeric section approximately adjacent to a first end;

an outwardly radially extending disc section adjacent approximately to a second end;

an outwardly radially extending frusto-conical camming section between said first and second ends;

said camming section and disc section having approximately equal radii.

13. A poppet valve as defined in claim 12 further characterized by:

an annular shoulder facing said second end and a cylindrical wall section adjacent said shoulder being sized to be received by and seat an end of a coil spring.

* * * * *